No. 811,679. PATENTED FEB. 6, 1906.
M. F. WILLIAMS.
CAGE FOR CRUSHERS AND PULVERIZERS.
APPLICATION FILED JAN. 14, 1905.

Witnesses:
G. A. Pennington
A. J. McCauley

Inventor:
M. F. Williams
by Bakewell & Cornwall
Attys.

UNITED STATES PATENT OFFICE.

MILTON F. WILLIAMS, OF ST. LOUIS, MISSOURI, ASSIGNOR TO WILLIAMS PATENT CRUSHER & PULVERIZER COMPANY, OF ST. LOUIS, MISSOURI, A CORPORATION OF MISSOURI.

CAGE FOR CRUSHERS AND PULVERIZERS.

No. 811,679.   Specification of Letters Patent.   Patented Feb. 6, 1906.

Application filed January 14, 1905. Serial No. 241,101.

*To all whom it may concern:*

Be it known that I, MILTON F. WILLIAMS, a citizen of the United States, residing at St. Louis, Missouri, have invented a certain new and useful Improvement in Cages for Crushers and Pulverizers, of which the following is a full, clear, and exact description, such as will enable others skilled in the art to which it appertains to make and use the same, reference being had to the accompanying drawings, forming part of this specification, in which—

Figure 1:
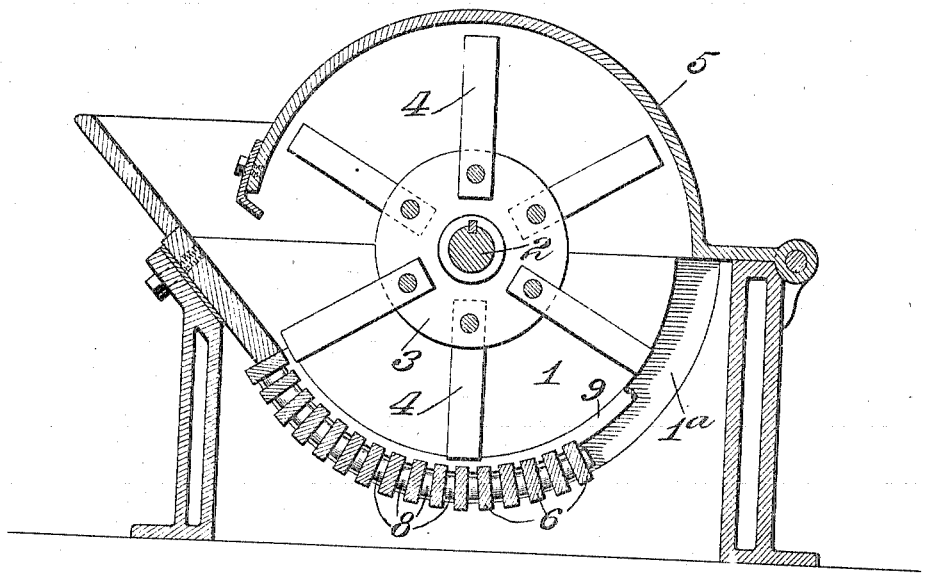
Figure 8:
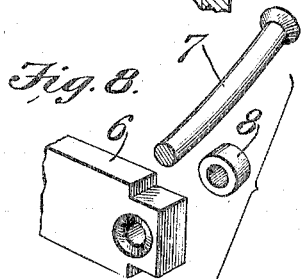

Figure 1 is a vertical sectional view through a crusher or pulverizer in which my improved cage is mounted. Figs. 2 to 7, inclusive, are detail sectional views showing the method of adjusting the cage; and Fig. 8 illustrates one of the cage-bars, its spacing-washer, and securing-rivets.

This invention relates to a new and useful improvement in cages for crushers and pulverizers, the object being to construct a sectional cage so that the parts thereof will occupy a small amount of space in shipping and also to provide ring-mounts of varying sizes for the cage-bars whereby the several sections may be removed, new ring-mounts of a different size inserted so as to adjust the cage bars inwardly toward the axis of rotation of the revolving beaters to take up the wear on the ends of said beaters.

In the drawings, 1 indicates the side frame of the machine, in which is mounted a rotatable shaft 2, having hammer or beater supports 3, pivotally carrying beaters 4.

5 is the top or cover of the machine. The material to be acted upon is fed into a hopper at the forward end of the machine, at the lower end of which it is acted upon by the revolving beaters. The material is caused to pass over a cage or screen until it is reduced to such size that its particles can pass through the openings therebetween, said screen preferably consisting of bars, as indicated in the drawings. The side frames 1 are provided with curved seats 1ª for receiving the cage-bars and ring-mounts of different sizes, and in order to remove the cage and adjust it or put in new bars it is only necessary to raise the hinged cover and withdraw the cage from its circular grooved seat.

Figure 2:
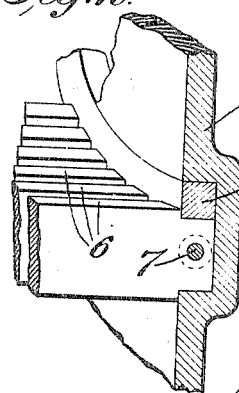

It is part of my present invention to group the cage-bars so that the cage may be inserted or removed in sections, and thus avoid binding or cramping, which is usually incident to the removal or insertion of a built-up cage. The bars 6 are preferably of uniform size throughout their length, and a number of these bars may be secured together by rivets 7, passing through the reduced ends thereof, said bars being spaced apart by washers 8 of the desired thickness, so that a number of bars may constitute a cage unit. The curved seat 1ª in the side frame 1 is of such radial depth as to receive the groups of cage-bars and leave a space within the circle of cage-bars or outside them, depending upon the position it is desired that the cage shall occupy with respect to the path of rotation of the beaters. When the beaters are new and unworn, it is desirable that the cage-bars rest against the outer edge of the groove 1ª, or that edge of the groove which is farthest from the axis of rotation of the beaters, and in order to hold the cage-bars or groups of cage-bars in position I introduce a ring-mount 9, which fills the space between the cage-bars and the inner edge of the groove 1ª, or that edge of the groove which is nearest to the axis of rotation of the beaters. This is shown in Fig. 2.

Figures 3, 4, 5, 6, 7:
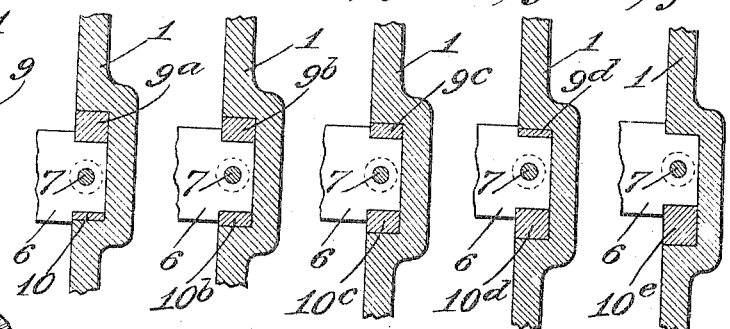

To adjust the cage-bars inwardly when the hammers are worn, the ring 9 is removed and a ring 10 is employed on the outer side of the cage-bars, as shown in Fig. 3, an inner ring 9ª, of less depth than the ring 9, being employed to hold the cage-bars firmly in place. The shoulders on the cage-bars are useful in holding these inner and outer ring mounts against lateral displacement. For the next adjustment (shown in Fig. 4) an outer ring 10ᵇ, of greater depth than the ring 10, is used and an inner ring 9ᵇ, of less depth than the ring 9ª, is used, the adjustments being effected by different-sized inner and outer rings, as shown in Figs. 5, 6, and 7, the last-mentioned figure showing the use of an outer-ring mount only, no inner ring being employed.

From the above it will be seen that in the outermost position an inner-ring mount only is employed, and in the innermost position an outer-ring mount only is employed, and in all intermediate positions inner and outer ring mounts of varying depths are employed; but the combined depths of the inner and outer ring mounts must in every instance equal the depth of either the inner or the outer ring mounts. (Shown in Figs. 2 and 7.) It will also be observed that the bars themselves are provided with restricted portions which serve to hold the ring-mounts in position, the shoulders adjacent the restricted portions serving to hold the ring-mounts against lateral displacement, and, further, that as the radii of the cage-bars change from the outermost to the innermost adjusted positions the groups of bars readily lend themselves to such a change. The purpose of riveting a plurality of these bars together is to facilitate and quicken the time in effecting a change in the adjustment of the radial distance of the cage from the axes of rotation of the hammers; but it is obvious that instead of grouping a plurality of cage-bars together the bars can be separately introduced.

Having thus described my invention, what I claim as new, and desire to secure by Letters Patent, is—

1. The combination with a support having a curved groove, of cage-bars having reduced ends projecting into said groove whereby shoulders are provided on the cage-bars adjacent said grooves, a ring-mount coöperating with said shoulders, and means independent of said ring-mount for holding the cage-bars spaced apart; substantially as described.

2. The combination with a support having a curved groove, of cage-bars having reduced ends projecting into said groove whereby shoulders are provided on the cage-bars adjacent said grooves, an inner-ring mount coöperating with said shoulders, and means independent of said ring-mount for holding the cage-bars spaced apart; substantially as described.

3. The combination with a support having a curved groove, of cage-bars having reduced ends projecting into said groove whereby shoulders are provided on the cage-bars adjacent said grooves, an outer-ring mount coöperating with said shoulders, and means independent of said ring-mount for holding the cage-bars spaced apart; substantially as described.

4. The combination with a support having a curved groove, of cage-bars having reduced ends projecting into said groove whereby shoulders are provided on the cage-bars adjacent said grooves, inner and outer ring mounts coöperating with said shoulders, and means independent of said rings for holding the bars spaced apart; substantially as described.

5. The combination with a support having a curved groove, of cage-bars which extend into said groove, a ring-mount coöperating with said cage-bars, and fastening devices projecting through the ends of said cage-bars to secure a plurality of them together so as to form cage units; substantially as described.

6. The combination with a support having a curved groove, of cage-bars which extend into said groove, and means separate from the cage-bars and adapted to be inserted in said groove for changing the radial distances of said cage-bars from the center of the support; substantially as described.

In testimony whereof I hereunto affix my signature, in the presence of two witnesses, this 10th day of January, 1905.

MILTON F. WILLIAMS.

Witnesses:
F. R. CORNWALL,
GEORGE BAKEWELL